(12) United States Patent
Newman

(10) Patent No.: US 11,122,906 B2
(45) Date of Patent: Sep. 21, 2021

(54) MULTI-ROLE OMNIBUCKET SEAT AND STORAGE SYSTEM

(71) Applicant: Paul William Newman, Warrington (GB)

(72) Inventor: Paul William Newman, Warrington (GB)

(73) Assignee: Omni Design LLC, Scottsdale, AZ (US)

( * ) Notice: Subject to any disclaimer, the term of this patent is extended or adjusted under 35 U.S.C. 154(b) by 0 days.

(21) Appl. No.: 16/932,745

(22) Filed: Jul. 18, 2020

(65) Prior Publication Data

US 2021/0030158 A1 Feb. 4, 2021

Related U.S. Application Data

(60) Provisional application No. 62/875,907, filed on Jul. 18, 2019.

(51) Int. Cl.
| | | |
|---|---|---|
| *A47C 1/00* | (2006.01) |
| *A47C 7/62* | (2006.01) |
| *A47C 9/10* | (2006.01) |
| *A47C 3/20* | (2006.01) |
| *A47C 7/00* | (2006.01) |
| *A01K 97/22* | (2006.01) |

(52) U.S. Cl.
CPC ............. *A47C 7/626* (2018.08); *A01K 97/22* (2013.01); *A47C 3/20* (2013.01); *A47C 7/008* (2013.01); *A47C 9/10* (2013.01)

(58) Field of Classification Search
CPC ........... A47C 7/008; A47C 7/626; A47C 3/20; A47C 9/10; A01K 97/22

USPC .... 297/129, 188.08–188.13, 423.39, 423.41, 297/462

See application file for complete search history.

(56) References Cited

U.S. PATENT DOCUMENTS

| | | | | |
|---|---|---|---|---|
| 2,765,025 A | * | 10/1956 | Bakalic ................. | A47C 7/72 297/188.08 |
| 3,751,845 A | * | 8/1973 | van Leeuwen ....... | A01K 97/06 297/188.09 X |
| 4,067,607 A | * | 1/1978 | Battles ................... | A01K 97/22 297/462 |
| 4,999,943 A | * | 3/1991 | Crabtree ............... | A01K 97/06 43/54.1 |
| 5,799,787 A | * | 9/1998 | Talbot ................... | B25H 3/025 206/315.11 |
| 5,813,528 A | * | 9/1998 | Bliek .................... | A01K 97/06 206/315.11 |

(Continued)

FOREIGN PATENT DOCUMENTS

FR 2569948 A1 * 3/1986 ............. A01K 97/22

*Primary Examiner* — Rodney B White
(74) *Attorney, Agent, or Firm* — Law Offices of David O. Caplan, PLLC

(57) ABSTRACT

A seat and storage system is provided that can be used for fishing in various circumstances, including in water that is located remotely and/or located next to uneven or highly sloped ground. The seat and storage system is designed to combine seating with adaptable integrated storage units in a single multi-purpose unit that can be carried against a person's back by utilizing adjustable shoulder straps. In addition, a drop bag can be placed inside the unit when it is in an open state and the drop bag can be used to hold bait, the catch, or a variety of other items.

3 Claims, 7 Drawing Sheets

(56) References Cited

U.S. PATENT DOCUMENTS

| | | | |
|---|---|---|---|
| 8,806,803 B1 * | 8/2014 | Mitchell | A01K 97/06 |
| | | | 43/54.1 |
| 9,253,970 B2 * | 2/2016 | Carnevali | H01F 7/0257 |
| 9,420,860 B2 * | 8/2016 | Jaffe | A47F 5/02 |
| 10,295,172 B2 * | 5/2019 | Bowden | B25H 3/025 |

* cited by examiner

MULTI-ROLE OMNIBUCKET SEAT AND STORAGE SYSTEM

CROSS-REFERENCE TO RELATED APPLICATIONS

This application claims priority to U.S. Provisional Patent Application Ser. No. 62/875,907 filed on Jul. 18, 2019 and entitled "MULTI-ROLE OMNIBUCKET SEAT AND STORAGE SYSTEM," the disclosure of which is incorporated by reference in its entirety for all purposes.

FIELD

Various embodiments are directed to a container having a seat, and more particularly, to a seat and storage system having adaptable integrated storage units, a multi-purpose bag, and a seat that can be stored as an easy to carry unit for use in fishing or a wide variety of other purposes such as picnics, concerts, sporting events, family outings, and the like.

BACKGROUND

Fishing is often performed in areas that require the fisherman to hike to the water. Typically, there are no chairs or other places for the fisherman to sit. In addition, the fisherman often finds himself in remote areas, and thus it is necessary for the fisherman to carry a large number of items, such as hooks, bait, fishing line, cleaning tools, and a wide variety of other items that may be needed.

It would be desirable to have a unit that is lightweight and easy to carry as the fisherman often needs to hike to remote locations in order to reach water for fishing.

In addition, it would be desirable to have a sealable bag or other device for storing bait, the catch, or a device that could be used for mixing ground bait.

Existing devices fail to provide a single unit that can be used as a seat, with multiple storage units, all in an easy to carry, lightweight unit. Such a device, in a single unit, could be used for a wide variety of purposes, including fishing, picnics, concerts, sporting events, family outings, and the like.

Various embodiments of the present disclosure help resolve such issues in an efficient manner.

BRIEF DESCRIPTION OF THE DRAWINGS

A more complete understanding of the various embodiments may be derived by referring to the detailed description and claims when considered in connection with the following illustrative figures:

DETAILED DESCRIPTION

Exemplary System

Figure 1:
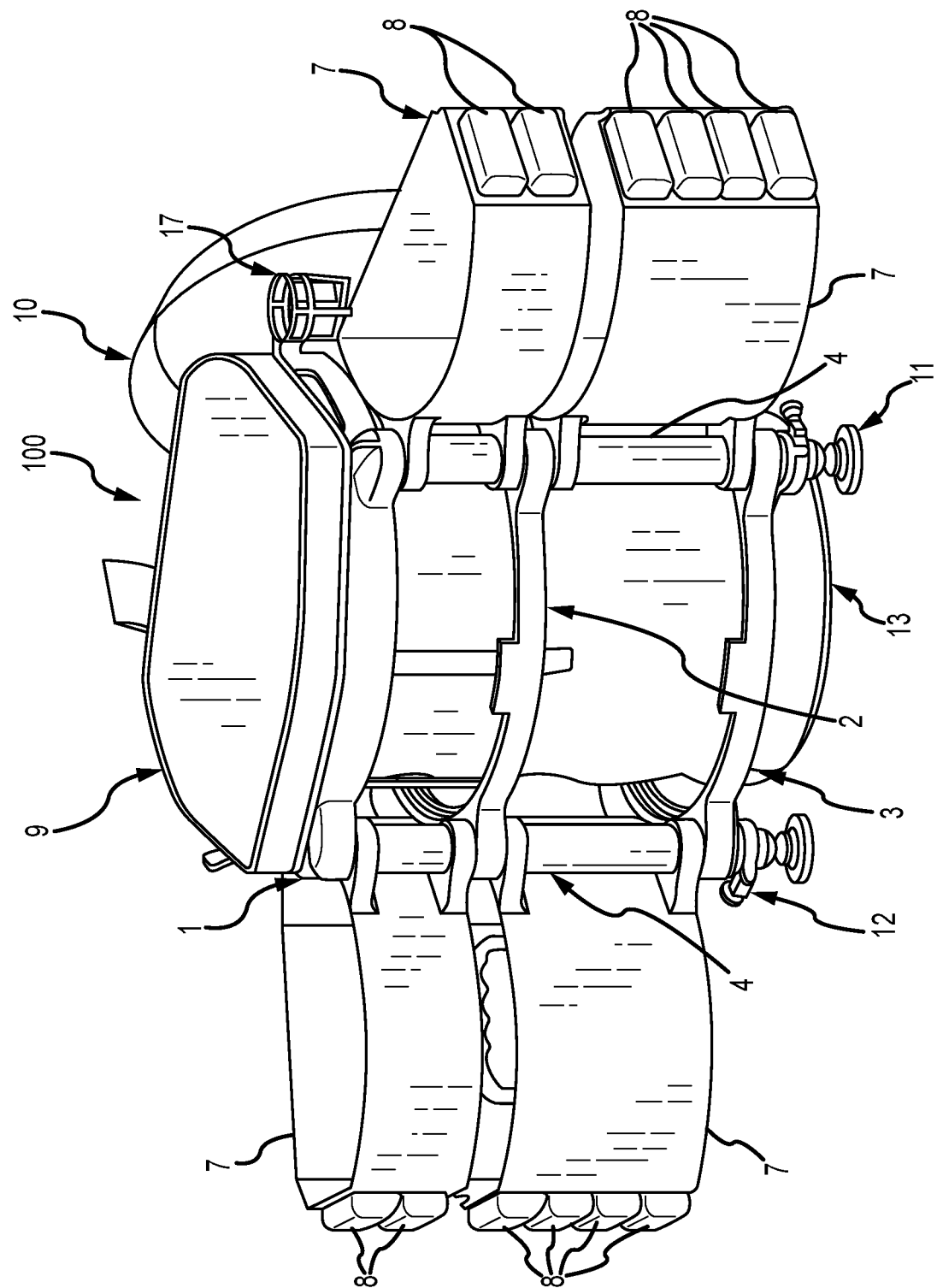
FIG. 1 illustrates a three-dimensional isometric view from the front of an exemplary multi-role seat and storage system in an open state, according to various embodiments.
Figure 2:
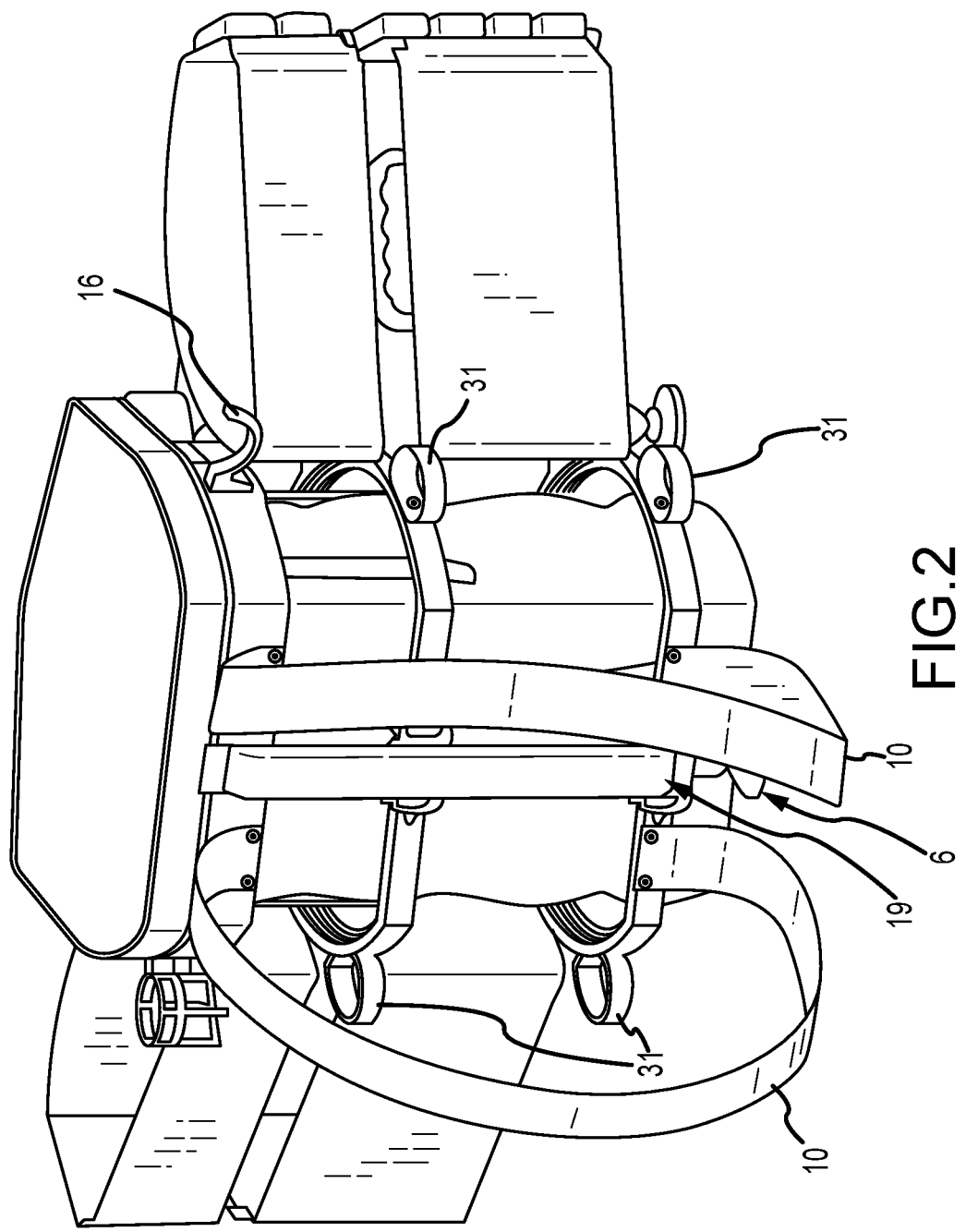
FIG. 2 illustrates a three-dimensional isometric view from the back of an exemplary multi-role seat and storage system in an open state, according to various embodiments.

A seat and storage system 100 in accordance to various aspects of the present invention is depicted in FIGS. 1 and 2 in an open state. In various embodiments, the seat and storage system 100 is designed to combine seating with adaptable integrated storage units 7 in a single multi-purpose unit that can be carried against a person's back by utilizing adjustable shoulder straps 10. In addition, in various alternative embodiments, the seat and storage system 100 is designed to be pulled along by wheels.

Figure 9:
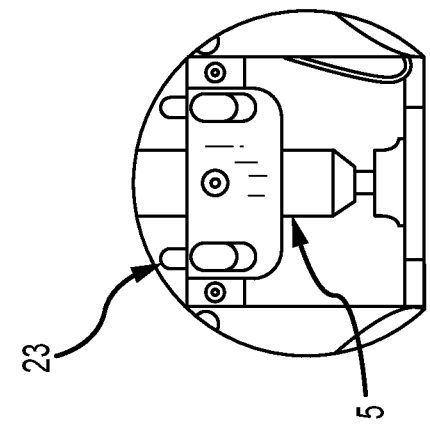
FIG. 9 illustrates a close up view of an exemplary rear support leg, according to various embodiments.
Figure 8:
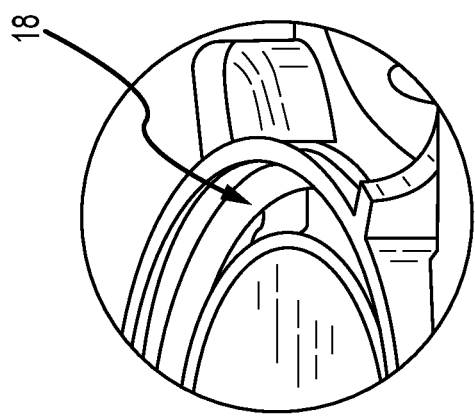
FIG. 8 illustrates a close up view of an exemplary seat removal mechanism, according to various embodiments.
Figure 11:
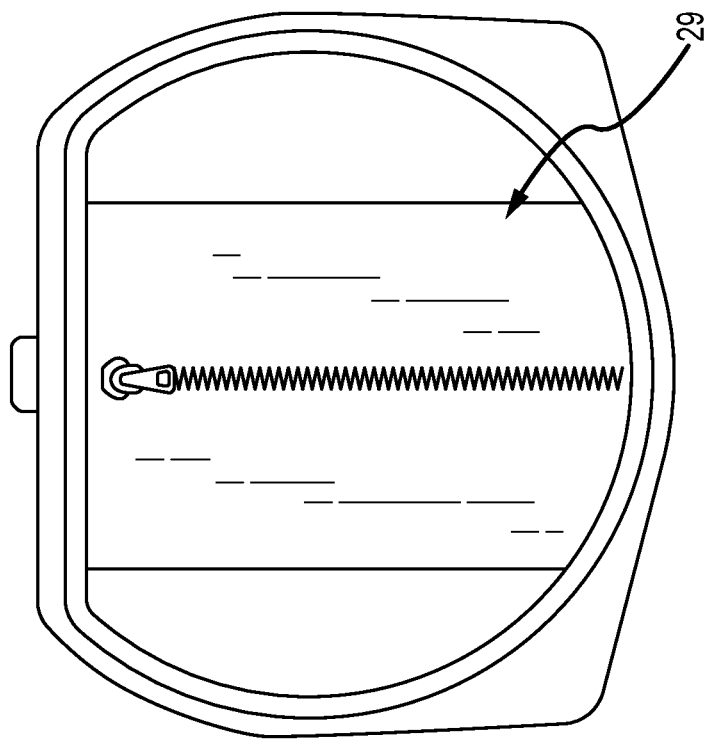
FIG. 11 illustrates a top view of an exemplary sealable storage pouch, according to various embodiments.
Figure 10:
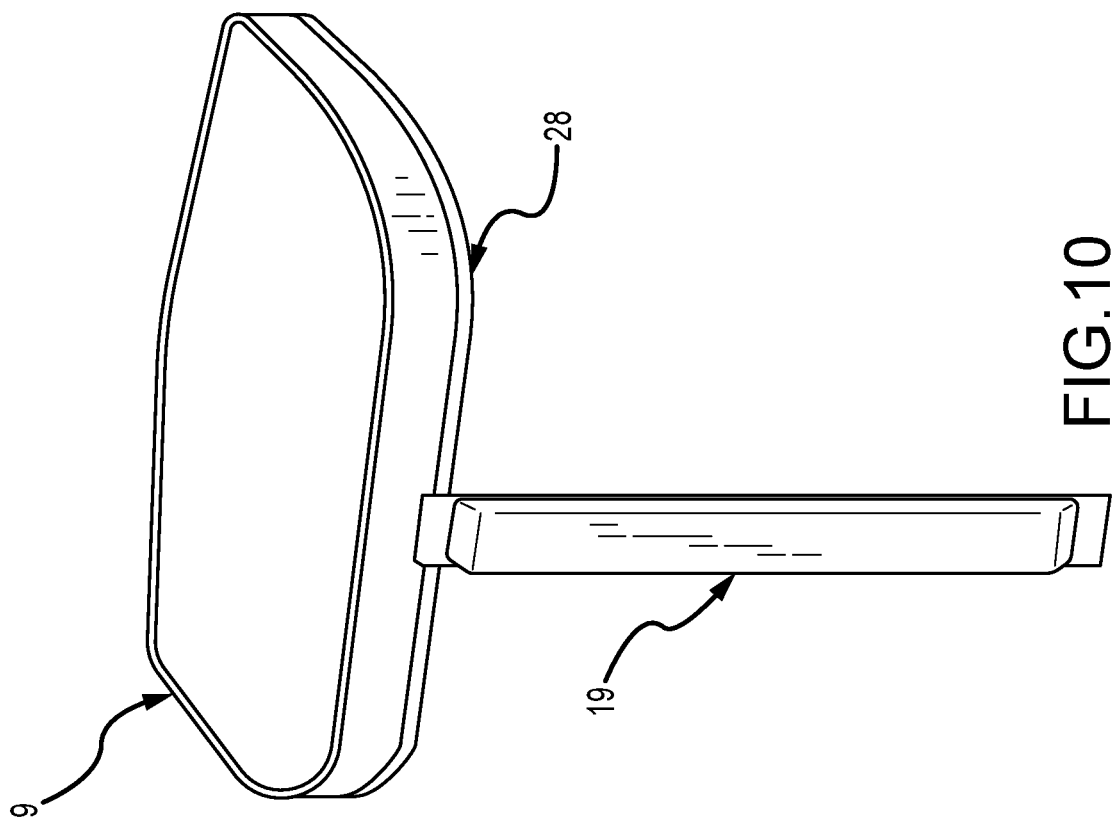
FIG. 10 illustrates an exemplary removable seat assembly, according to various embodiments.

With reference to FIGS. 1 and 2, upper frame support 1, intermediate frame support 2, and lower frame support 3 form a frame for seat and storage system 100. In this embodiment, front support leg assemblies 4 and a rear support leg 5 (FIG. 9) are positioned through holes in the frame supports to facilitate a clear unobstructed void within the frame. In this manner, the frame supports and leg assemblies and support leg form a tripod leg structure that can facilitate a removable padded seat unit 9. A plurality of pivoting storage compartments 7 are pivotally attached to leg assemblies 4 to facilitate a clear unobstructed void under the padded seat unit 9 when the unit is in an open state as depicted in FIGS. 1 and 2. Storage compartments 7 are pivotally attached to leg assemblies 4 by use of a series of vertically aligned rings that can vary in shape to suit style and function. In accordance with one embodiment of the present invention, storage compartments 7 and the vertically aligned rings can be injection molded using a thermoplastic polyurethane (TPUs) type material.

In accordance with various embodiments of the present invention, when the unit is in an open state, a multi-purpose bag 13 can be located in the clear unobstructed void under the padded seat unit 9. Multi-purpose bag 13 can be used for a variety of functions, including carrying bait, holding the catch, or used for mixing ground baits. When the invention is used for other purposes, multi-purpose bag 13 can hold food and other accessories, for example for a sporting event, concert, picnic, and family unit. As will be appreciated, multi-purpose bag 13 can hold a wide variety of items, depending on the situation. In accordance with one embodiment of the present invention, multi-purpose bag 13 is made of a liquid tight, light weight, strong and flexible material such as a polyurethane or silicone coated ripstop type material (e.g., nylon fabric). It will be appreciated that this is a material which will be waterproof, breathable and durable.

When the unit is in a closed state, the multi-purpose or drop bag 13 is either stored in the under seat compartment (such as a zip up or similar pocket 29 as illustrated in FIG.

11) or removed in order to close the compartments (pivoting storage compartments 7). In this manner, if a person has catch or bait in drop bag 13, then the drop bag is removed, sealed and carried with the shoulder strap.

Figure 5:
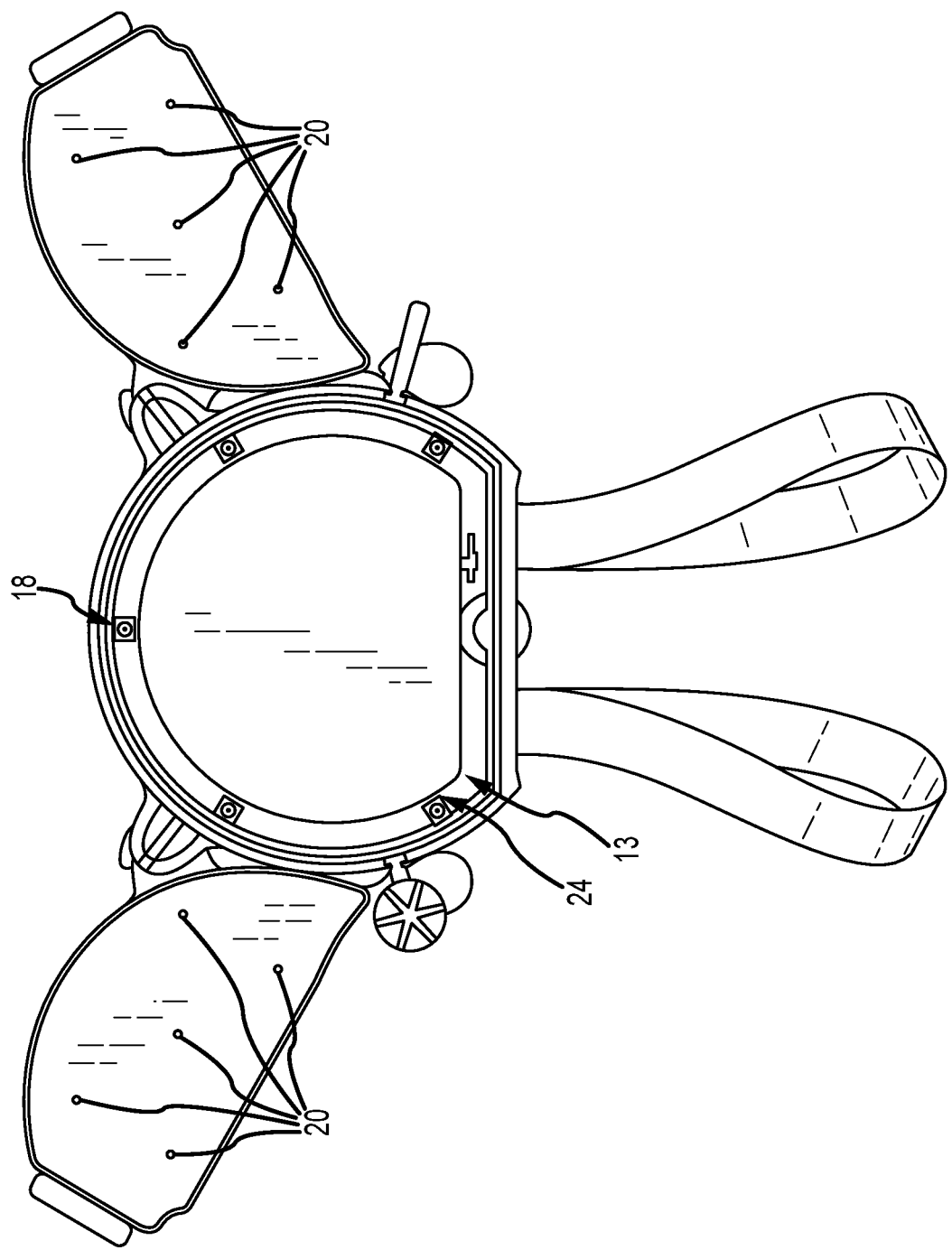
FIG. 5 illustrates a top view of an exemplary multi-role seat and storage system in an open state, according to various embodiments.
Figure 6:
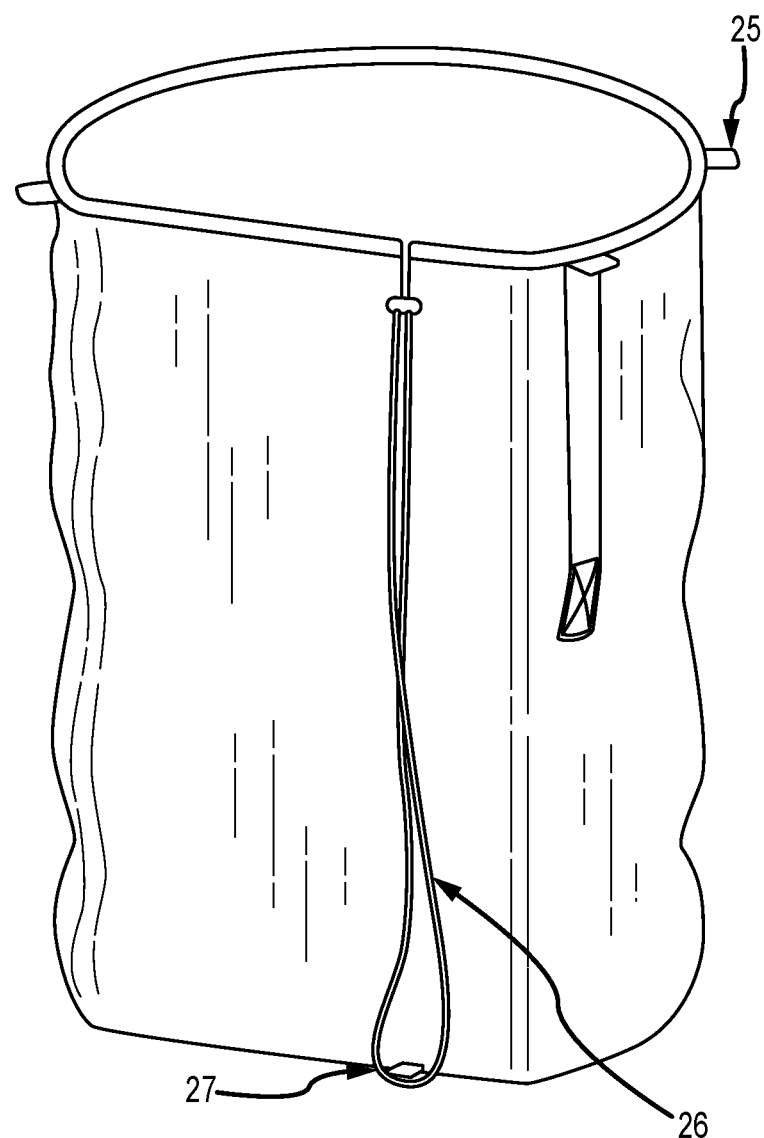
FIG. 6 illustrates an isometric view of an exemplary multi-purpose bag of an exemplary multi-role seat and storage system in an open state, according to various embodiments.

With reference to FIGS. 5 and 6, the drop bag is attached to the unit by way of strong, sufficiently long tabs 25 with reinforcing eyelets that attached to integrated hooks 18 in the upper frame support. The drop bag has a draw cord 26 with a toggle or similar mechanism that will keep the top of the bag tightly closed when necessary. In accordance with one embodiment of the present invention, draw cord 26 runs the full length of the drop bag and runs through a draw string holding loop 27 located at the bottom of the drop bag to allow the draw cord to form a shoulder or hand carry strap when the bag is loaded.

In accordance with various embodiments of the present invention, with reference to FIG. 1, front support leg assemblies 4 are independently height adjustable and can be fitted with a fully floating adjustable self-levelling foot assembly 11. In accordance with various aspects of the present invention, front leg assemblies 4 can be made from either carbon fiber or an aluminium type material, or any other suitable material that is lightweight and strong, such as a carbon mix type material. The independent adjustable front support leg assemblies allow for using the seat unit on very uneven or highly sloped ground. The method for carrying out the independently height adjustable leg assemblies can be carried out by a variety of devices, including any suitable load rated device (e.g., clamp, pin, or friction twist lock).

Figure 7:
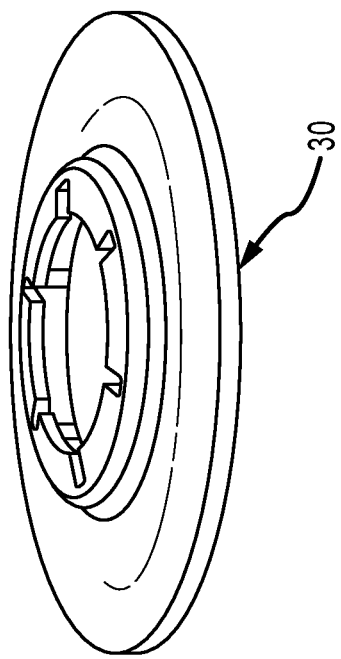
FIG. 7 illustrates an exemplary load spreading foot accessory, according to various embodiments.

With reference to FIGS. 2 and 7, in accordance with an aspect of the present invention, rear support leg 5 is fixed with a floating foot assembly 6 that can optionally have an easily attachable load spread pad 30 for use on soft ground. It will be appreciated that foot assembly 11 can be similar to the load spread pad used with rear support leg 5.

With continued reference to FIG. 2, the back of the unit is shaped such that carrying the unit against a person's back can be done in a comfortable manner. In accordance with one embodiment of the present invention, adjustable shoulder straps 10 are provided to facilitate carrying the unit against a person's back. In addition, the rear faces of pivoting storage compartments 7 have a plurality of padded back rests 8 to protect the person's back when carrying the unit and to make it more comfortable to carry the unit. In certain embodiments of the present invention, a fixed padded back rest 19 is attached to the unit to make it even more comfortable to carry.

In accordance with another aspect of the present invention, with reference to FIG. 2, a plurality of straps 31 are provided on either side of the unit. Straps 31 can be suitable systems such as nylon webbing, Velcro, or other similar material. It will be appreciated that straps 31 can be used to allow attachment of fishing rods, poles, or gaffs for ease in carrying. In certain embodiments of the present invention, the lower strap 31 can take the form of a pocket to provide support for heavier items if required. In addition, one or more rod butt holder 16 can be used to hold or rest the rods and poles that are being carried.

Figure 4:
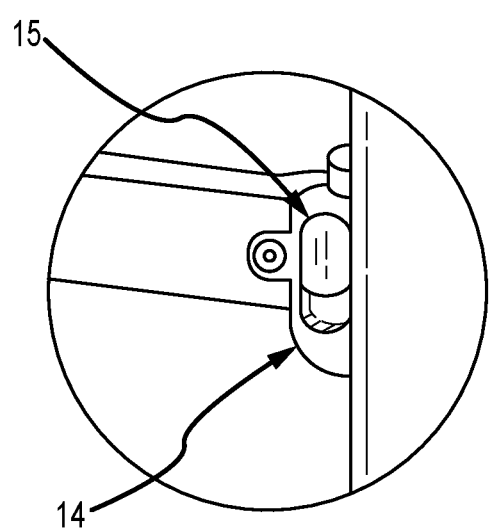
FIG. 4 illustrates a close up view of an exemplary storage compartment locking mechanism, according to various embodiments.

With reference to FIG. 1, in accordance with various embodiments of the present invention, seat unit 9 is easily removable to provide easy access to catch bag 13. In addition, pivoting storage compartments 7 are hinged around the appropriate legs (as described above) to allow easy access to any items stored in the storage compartments. With reference to FIG. 4, pivoting storage compartments 7 when in a closed or stored position, can be retained via a suitable lock assembly 14 and 15 on the rear and a physical stop on the front. It will be appreciated that this system will provide for sufficient rigidity for storage trays 7 to provide for back protection when the unit is carried.

Figure 3:
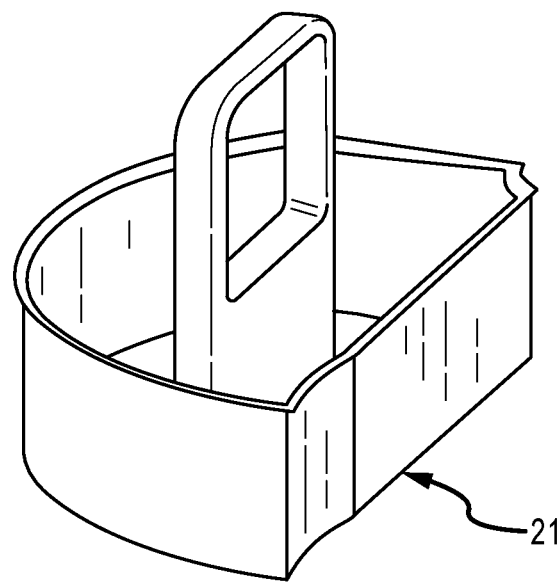
FIG. 3 illustrates an optional removable tray, according to various embodiments.

With reference to FIG. 5, pivoting storage compartments 7 may have drainage holes 20 to make it easier to clean fish or any other cleaning need. In certain embodiments of the present invention, with reference to FIG. 3, optional removable trays 21 can be fitted for neat and safe arrangement of tackle. The trays can take the form of die cut foam or similar.

The detailed description of various embodiments herein makes reference to the accompanying figures, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment. Definitions for terms that may be used throughout this disclosure are exemplary and non-exclusive. The terms used in this disclosure may have alternate meanings or definitions consistent with the disclosure, and the present disclosure is not limited to any particular definition or interpretation of any particular term.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seat and storage system comprising:
    a frame including an upper frame support, an intermediate frame support, and a lower frame support;
    a seat unit connected to a top end of the frame;
    a plurality of leg assemblies, wherein each of said leg assemblies is inserted through each of the upper, intermediate and lower frame supports;
    and a plurality of pivoting storage compartments connected to one of the leg assemblies, wherein each of the plurality of storage compartments are configured to pivot around the connected leg assembly.

2. The seat and storage system of claim 1, wherein one or more of the leg assemblies are independently height adjustable.

3. The seat and storage system of claim 1, wherein a bucket is located within the frame when the seat and storage system is in an open state.

* * * * *